United States Patent
Kitta et al.

(10) Patent No.: US 10,811,939 B2
(45) Date of Patent: Oct. 20, 2020

(54) ROTATING ELECTRIC MACHINE

(71) Applicant: Mitsubishi Electric Corporation, Tokyo (JP)

(72) Inventors: Yoshiaki Kitta, Tokyo (JP); Koichi Ojima, Tokyo (JP); Katsunari Takagi, Tokyo (JP); Masaya Inoue, Tokyo (JP); Hiroyuki Higashino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 27 days.

(21) Appl. No.: 15/505,304

(22) PCT Filed: Oct. 28, 2014

(86) PCT No.: PCT/JP2014/078544
§ 371 (c)(1),
(2) Date: Feb. 21, 2017

(87) PCT Pub. No.: WO2016/067352
PCT Pub. Date: May 6, 2016

(65) Prior Publication Data
US 2017/0271958 A1     Sep. 21, 2017

(51) Int. Cl.
*H02K 9/19* (2006.01)
*H02K 5/20* (2006.01)

(52) U.S. Cl.
CPC .............. *H02K 9/19* (2013.01); *H02K 5/20* (2013.01)

(58) Field of Classification Search
CPC .. H02K 3/28; H02K 3/32; H02K 5/10; H02K 5/20; H02K 9/19
See application file for complete search history.

(56) References Cited

U.S. PATENT DOCUMENTS

| | | | |
|---|---|---|---|
| 8,928,195 B2 * | 1/2015 | Ohashi | H02K 1/32 310/54 |
| 9,660,502 B2 * | 5/2017 | Matsuki | H02K 1/32 |
| 2008/0024020 A1 * | 1/2008 | Iund | H02K 5/20 310/61 |

(Continued)

FOREIGN PATENT DOCUMENTS

| | | |
|---|---|---|
| DE | 102007033457 A1 | 2/2008 |
| JP | 2005-229671 A | 8/2005 |
| JP | 2012-157098 A | 8/2012 |

(Continued)

OTHER PUBLICATIONS

International Search Report for PCT/JP2014/078544, dated Jan. 20, 2015.

(Continued)

*Primary Examiner* — Tran N Nguyen
*Assistant Examiner* — Leda T Pham
(74) *Attorney, Agent, or Firm* — Sughrue Mion, PLLC; Richard C. Turner

(57) ABSTRACT

In order to efficiently cool a stator and rotor of a rotating electrical machine, cooling oil is supplied by a pump in a pressurized state to a first reservoir portion provided in an upper portion inside a housing, and after the cooling oil is ejected from the first reservoir portion, the cooling oil is guided to a stator coil end cooling structure, and to a rotor bearing and rotor core cooling structure, using the weight of the cooling oil itself.

11 Claims, 4 Drawing Sheets

(56) References Cited

U.S. PATENT DOCUMENTS

2011/0298314 A1* 12/2011 Atarashi ................ B60K 6/405
 310/54
2014/0346905 A1* 11/2014 Matsui ..................... H02K 9/19
 310/54

FOREIGN PATENT DOCUMENTS

| JP | 2013-240125 A | 11/2013 | | |
|---|---|---|---|---|
| JP | 2014068453 A | * | 4/2014 | ............... H02K 1/32 |
| JP | 2014-107905 A | 6/2014 | | |

OTHER PUBLICATIONS

Communication dated Nov. 7, 2017, from the Japanese Patent Office in counterpart application No. 2016-556073.
Office Action dated Feb. 12, 2020 from the German Patent and Trademark Office in Application No. 112014007108.0.

* cited by examiner

ROTATING ELECTRIC MACHINE

CROSS REFERENCE TO RELATED APPLICATIONS

This application is a National Stage of International Application No. PCT/JP2014/078544 filed Oct. 28, 2014, the contents of all of which are incorporated herein by reference.

TECHNICAL FIELD

The present invention relates to a rotating electrical machine, and in particular, relates to a rotating electrical machine wherein a stator and rotor are cooled with cooling oil.

BACKGROUND ART

A rotating electrical machine is configured of a rotor, which rotates freely, and a stator provided so as to enclose the rotor, wherein a motor is configured in such a way that rotational force of the rotor is obtained by current being caused to flow through a stator coil wound around the stator, and a generator is such that current is generated in the stator coil by the rotor being caused to rotate. These rotating electrical machines are such that the stator and stator coil generate heat owing to current flowing through the stator coil when the rotor rotates, and operating efficiency decreases due to the generated heat. Because of this, operating efficiency is maintained by cooling the rotor and stator.

A method whereby, in order to supply cooling oil to lubricated places and cooled places of a stator and rotor embedded in an interior of a rotating electrical machine, the cooling oil is stocked inside a housing of the rotating electrical machine, and the cooling oil is scooped up utilizing rotary motion of the rotor of the rotating electrical machine or a reducer cogwheel and temporarily stocked in a reservoir portion provided in an upper portion of the rotor, after which lubrication and cooling of the rotor is carried out by the cooling oil being supplied to the inside of a hollow shaft of the rotor, has been proposed as a cooling method (for example, refer to Patent Document 1).

Also, a method configured so that cooling oil is pressurized using a pump and led to a stator (for example, Patent Document 2), and a method whereby, with a rotor shaft having a hollow cylindrical form, cooling oil is pressure-fed to the cylindrical portion using a pump in order to cool the rotor (for example, Patent Document 3), have been proposed.

CITATION LIST

Patent Literature

Patent Document 1: JP-A-2009-209965
Patent Document 2: JP-A-2011-193642
Patent Document 3: JP-A-2010-104206

SUMMARY OF INVENTION

Technical Problem

The rotating electrical machine cooling method proposed in Patent Document 1 is such that the cooling oil is scooped up utilizing the rotary motion of the rotor or the like, because of which there is an advantage in that there is no need for a pump for pressure feeding the cooling oil, but as loss torque occurs when the oil is scooped up, and the amount of cooling oil scooped up fluctuates depending on the state of the oil surface, there is a problem in that rotor cooling performance is unstable.

Also, the cooling methods proposed in Patent Documents 2 and 3 are such that cooling oil is supplied using a pump, because of which, although the amount of cooling oil supplied is stable, a cooling target is independent, meaning that two pumps are necessary, those being a pump for cooling the stator and a pump for cooling the rotor, and an increase in size and high cost of the rotating electrical machine are problems. Even supposing that there is one pump and one path along which cooling oil is supplied, supplies of cooling oil to a stator and rotor in distanced places are connected with a pipe, because of which there are problems in that the path becomes long and pressure loss increases, a pump of higher performance is necessary, and an increase in size and increase in cost of the rotating electrical machine are unavoidable, as previously described.

The invention, having been contrived in order to resolve the previously described kinds of existing problem, has an object of providing a rotating electrical machine such that both a stator and rotor can be cooled with cooling oil supplied at low pressure loss.

Solution to Problem

A rotating electrical machine according to the invention includes a structure wherein cooling oil is supplied by a pump in a pressurized state to a first reservoir portion provided in an upper portion inside a housing, the cooling oil is ejected from the first reservoir portion, and the cooling oil is guided to a stator cooling structure and a rotor cooling structure using the weight of the cooling oil itself, whereby both a stator and a rotor are efficiently cooled.

Also, the rotor cooling structure has a second reservoir portion in which the guided cooling oil is stocked, and is of a configuration wherein the cooling oil is guided from the second reservoir portion into a bearing oil path that supplies the cooling oil to a bearing of the rotor and into a shaft oil path of a shaft of the rotor.

Advantageous Effects of Invention

The invention is such that, by employing a cooling structure wherein cooling oil is force-fed into a rotating electrical machine by a pump and temporarily stocked, and the cooling oil after being ejected is supplied using the weight of the cooling oil itself to a stator and a rotor, the invention can provide a rotating electrical machine that includes a cooling structure such that the cooling oil can be reliably supplied to both the stator and rotor while restricting pressure loss to a minimum, which does not need a cooling oil scooping mechanism, and is such that the size and weight of the rotating electrical machine can be reduced and efficiency thereof increased.

DESCRIPTION OF EMBODIMENTS

Hereafter, using the drawings, an embodiment of a rotating electrical machine of the invention will be described.

Figure 1:
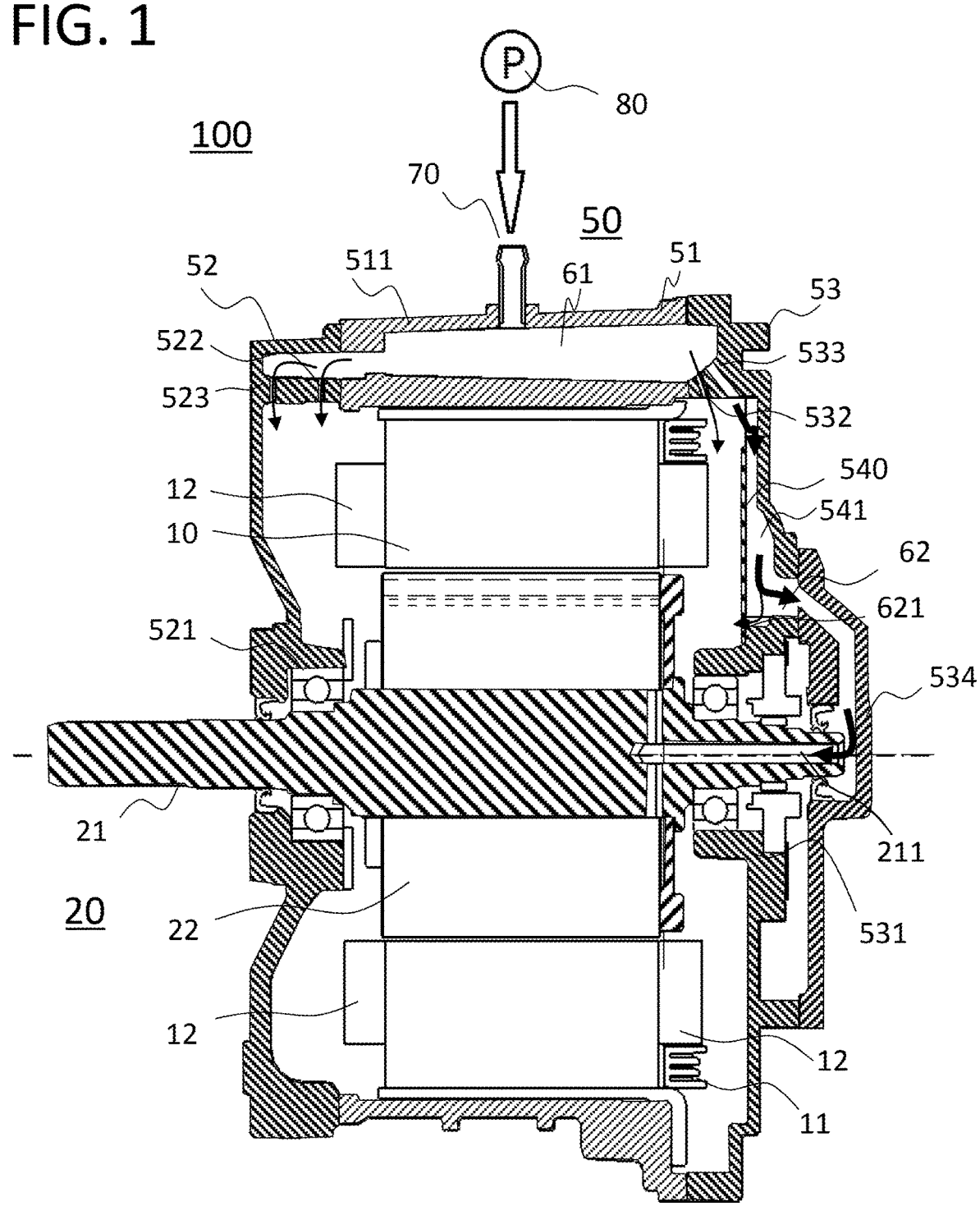
FIG. 1 is a sectional schematic view of a rotating electrical machine, which is an embodiment of the invention.

FIG. 1, being a sectional schematic view showing one embodiment of a rotating electrical machine 100 of the invention, is a sectional view in a direction of an axis of rotation of the rotating electrical machine 100.

A housing 50 of the rotating electrical machine 100 is of a configuration such that a body portion center frame 51, and both ends of the center frame 51, are closed with a front frame 52 and rear frame 53, a stator 10 is fixed in the center frame 51 of the housing 50, and a shaft 21 of a rotor 20 is supported by the front frame 52 and rear frame 53 via bearings 521 and 531 respectively. Also, the stator 10 is of a split tubular form disposed in a circular form and fitted into and fixed to an iron frame 511, and furthermore, the iron frame 511 is fixed to the aluminum center frame 51. A busbar holder 11, in which is housed a busbar that supplies power to each of U, V, and W phases, is disposed on a non-load side end face of the stator 10. Also, there is a coil end 12 in either axial direction end portion of the stator 10.

The rotor 20 is such that the shaft 21 supported by the load side bearing 521 and non-load side bearing 531, and a rotor core 22 on a peripheral surface of the shaft 21, are provided. Magnet housing holes 23 for housing permanent magnets parallel to the direction of the axis of rotation are disposed at equal intervals in a circumferential direction in the rotor core 22.

With respect to the structure of the rotating electrical machine 100, a cooling structure is configured as follows.

Figure 2:
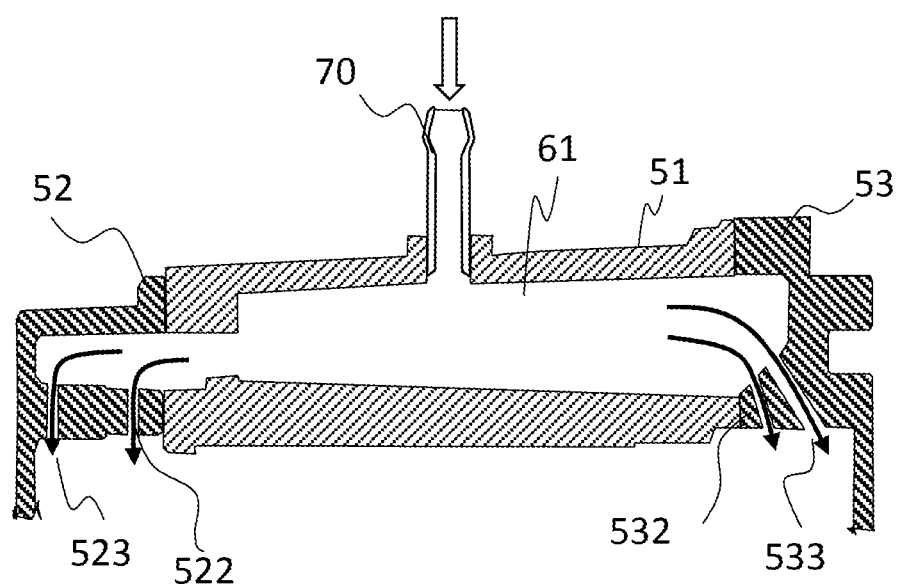
FIG. 2 is a diagram showing a flow of cooling oil in a first reservoir portion of FIG. 1.

That is, as shown in FIG. 1 and FIG. 2, a first reservoir portion 61 is provided in upper regions of the center frame 51, front frame 52, and rear frame 53 configuring the housing 50, and cooling oil force-fed from an external pump 80 is taken in from an inlet 70. As cooling oil entering from the inlet 70 of the first reservoir portion 61 flows into the front frame 52 and rear frame 53, the first reservoir portion 61 not only stocks cooling oil, but can also be said to be a first oil path penetrating the center frame 51 in the axial direction.

Cooling oil that has entered the first reservoir portion 61 is ejected toward the coil end 12 from coil vents 522 and 532 provided in the front frame 52 and rear frame 53 respectively, thereby cooling the stator 10. Furthermore, cooling oil is ejected toward the load side bearing 521 from a bearing vent 523 provided in the front frame 52, and used for lubricating and cooling the bearing 521.

Also, in addition to the coil vent 532, a shaft vent 533 is provided in the rear frame 53, configured so that cooling oil is guided to an end portion of the shaft 21 of the rotor 20. That is, a rear cover 534 is further provided on the rear frame 53, forming a cooling oil channel. Because of this, cooling oil ejected from the shaft vent 533 is guided into a cooling oil inlet portion 541 partitioned off by a cover 540, and stocked in a second reservoir portion 62 provided above the shaft 21. A hole 621 (i.e., a first hole) of a small diameter is provided in the second reservoir portion 62, configured so that cooling oil flowing out from the hole 621 is guided to the non-load side bearing 531. Also, cooling oil overflowing from the second reservoir portion 62 is guided to the end portion of the shaft 21 by a hole 535 (i.e., a second hole) in the rear cover 534, and used for cooling the rotor 20.

Figure 3:
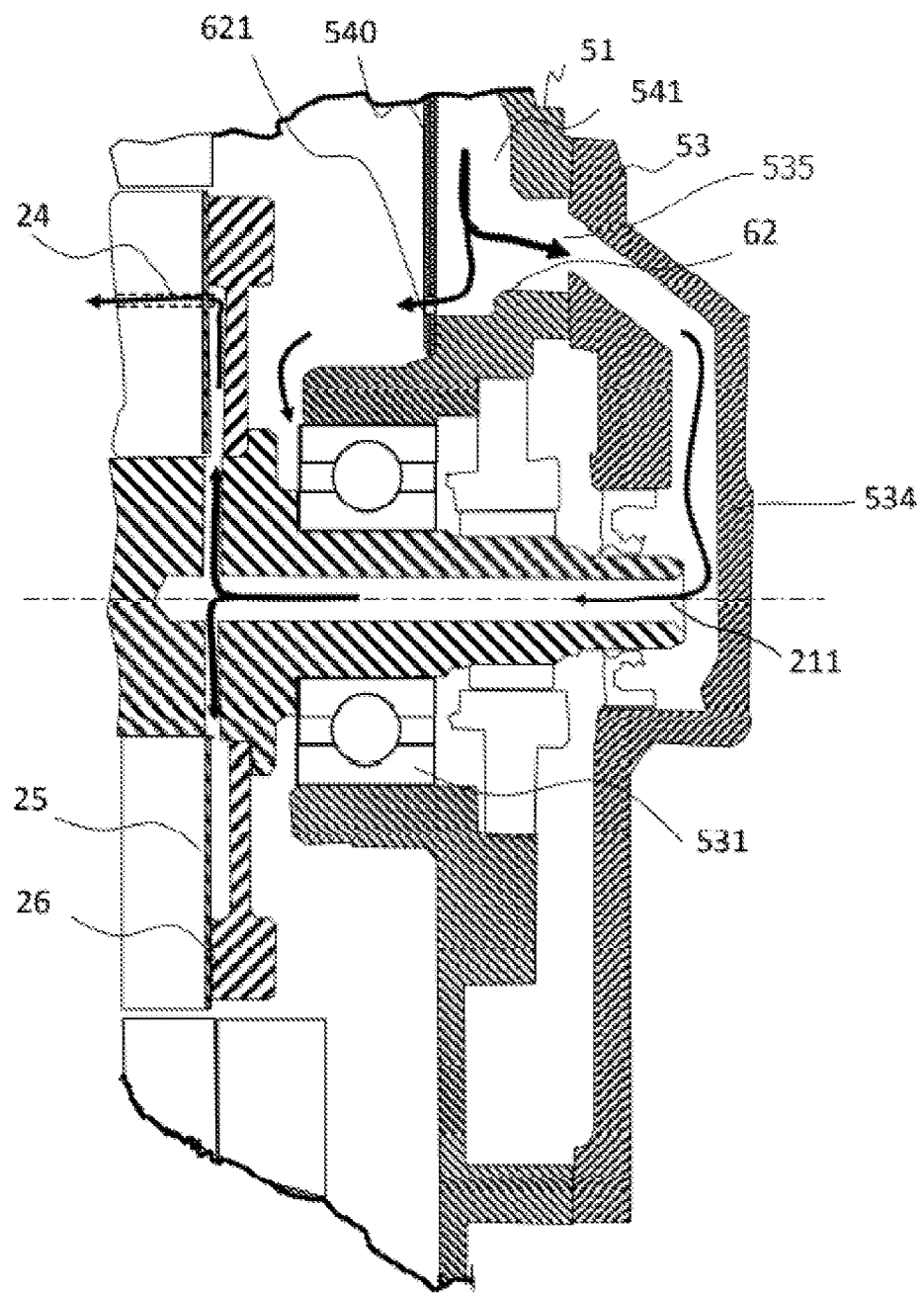
FIG. 3 a diagram showing a flow of cooling oil in a second reservoir portion of FIG. 1.
Figure 4:
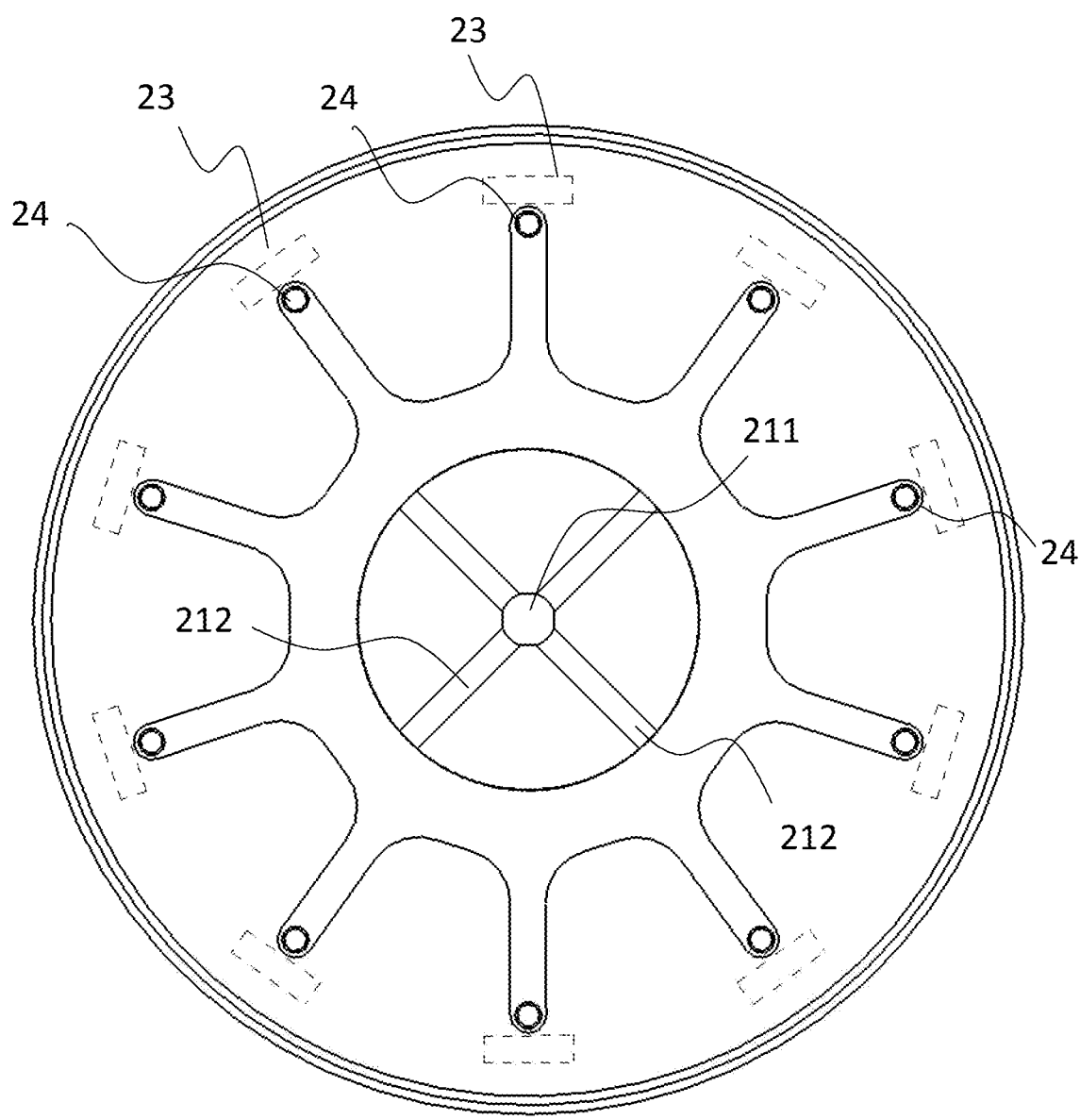
FIG. 4 is a sectional view showing an A-A section in a rotor of FIG. 3.

Cooling of the rotor 20 will be described using FIG. 3 and FIG. 4. FIG. 3 is an enlargement of one portion of the sectional view of FIG. 1, and in particular, shows a flow of cooling oil ejected from the shaft vent 533 of the rear frame 53. Although not illustrated in FIG. 1, through holes 24 that form cooling oil channels are provided in the rotor core 22, parallel to the axial direction of the shaft 21, at equal intervals in the circumferential direction of the rotor core 22, in the same way as the magnet housing holes 23. A non-load side end plate 25, in which through holes are provided so as to coincide with the through holes 24, is attached to an end face of the rotor core 22, and furthermore, an oil path plate 26 is attached to an outer side of the non-load side end plate 25. A gap is provided between the non-load side end plate 25 and oil path plate 26, and oil paths extending radially from the axis of rotation center are configured by the gap. As shown in the sectional view of FIG. 4, the forms of the oil paths are radial from a central portion, and the through holes 24 are positioned in leading end portions of the radial forms.

Also, a first shaft oil path 211, opened in the axial direction from the non-load side, and second shaft oil paths 212 extending in a radial direction from the first shaft oil path 211, are provided in the shaft 21 of the rotor 20, and the second shaft oil paths 212 are disposed so as to coincide with the previously described gap between the non-load side end plate 25 and oil path plate 26. Through holes, wherein the through holes 24 of the rotor core 22 and at least one portion of outer side end portions of the radial oil paths provided in the oil path plate 26 coincide, are provided in the non-load side end plate 25.

According to this configuration, cooling oil supplied to the first shaft oil path 211 of the shaft 21 is ejected from the second shaft oil path 212 by centrifugal force generated in accompaniment to rotation of the shaft 21, guided into the through holes 24 by the oil path plate 26, and ejected on the load side of the rotor core 22 as though impelled. The rotor core 22 and the permanent magnets are cooled by the flow of this cooling oil.

Although not shown, cooling oil pressurized and supplied to the first reservoir portion by the pump 80 is such that cooling oil stocked in an oil pan provided in a lower portion of the housing 50 is suctioned up by the pump 80, circulated, and used.

As heretofore described, cooling oil is force-fed into the first reservoir portion, the cooling oil is ejected from the first reservoir portion, the cooling oil is guided to the stator cooling structure and rotor cooling structure, and cooling of each of the stator and rotor is carried out, without connecting continuous high pressure piping to each region that needs cooling. Because of this, long piping is unnecessary, and pressure loss in the whole of the rotating electrical machine decreases, because of which a pump that pressurizes and feeds cooling oil can be reduced in size and an oil path shortened, whereby frame productivity can be improved and housing can be reduced in size. Also, as there is no structure wherein cooling oil is scooped up by a rotor or gear, there is little loss torque, and the efficiency of the rotating electrical machine can be increased.

Also, cooling oil ejected from the shaft vent 533 in the first reservoir portion 61 reaches the end portion of the shaft 21 from the second reservoir portion 62, as shown by arrows in the drawing. The invention is such that, by the dispositions being provided with height differences, cooling oil can be led to the shaft 21 by utilizing gravity, whereby a simplification, reduction in weight, and reduction in cost of the rotating electrical machine structure can be achieved.

By providing an oil path structure that extends in the radial direction, like the second shaft oil path 212, in the shaft 21 oil paths, the rotor itself creates advantages of ejecting and suctioning cooling oil owing to centrifugal force when the rotor rotates, because of which an amount of cooling oil sufficient for cooling the rotor can be obtained without cooling oil guided under the weight of the cooling oil itself being force-fed using a pump. Because of this, a simplification, reduction in weight, and reduction in cost of the rotating electrical machine structure can be achieved.

In this embodiment of the invention, a configuration wherein the bearing vent 523 and coil vents 522 and 532 are provided in addition to the shaft vent 533 is shown, but regardless of how many other vents are provided, design can be carried out provided that the focus is only on pressure loss in cooling oil ejected from the first reservoir portion 61 and on flow distribution. Because of this, the number of design steps can be reduced and a rise in pressure loss in the overall cooling system can be restricted, pump cost can be reduced, and the cooling oil piping configuration can be simplified, because of which vents may be added as necessary.

Also, it has been described that, by one portion of cooling oil being caused to flow through the hole 621 provided in the cover 540, cooling and lubrication of the non-load side bearing 531 below the hole 621 is carried out, but furthermore, by a step being provided in a lower end of the second reservoir portion 62, an amount of cooling oil equivalent to the capacity created by the step can always be secured for bearing lubrication, even when the amount of cooling oil flowing into the shaft is excessive.

The rotating electrical machine described thus far is such that cooling oil is applied directly to the coil end 12 from the coil vents 522 and 532, but depending on the dispositions of the coil vents 522 and 532, cooling oil may be led to the coil end 12 via another member. This also applies to the bearings. Also, as previously described, each individual vent may instead be a multiple of vents oriented toward each region.

The rotating electrical machine described thus far is such that the frame structure is a structure split into three frames, those being the front, center, and rear, but various splitting aspects can be chosen, such as a two-frame split wherein the front and center frames are an integrated structure split from the rear frame, or an aspect wherein the center and rear frames are an integrated structure split from the front frame.

The rotating electrical machine described thus far is shown to have a structure wherein the iron frame 511 is attached to the center frame 51, but the structure may be such that the iron frame 511 is attached to the rear frame 53 or front frame 52.

The embodiments of the invention can be freely combined, and each embodiment can be modified or abbreviated as appropriate, without departing from the scope of the invention.

The invention claimed is:

1. A rotating electrical machine, comprising:
   a first reservoir portion provided in an upper portion inside a housing and having a vent from which cooling oil is ejected;
   a pump that supplies the cooling oil in a pressurized state to the first reservoir portion; and
   a guide portion that guides the cooling oil ejected from the first reservoir portion to a stator cooling structure and a rotor cooling structure using a weight of the cooling oil itself,
   wherein the rotor cooling structure comprises a second reservoir portion provided above a shaft of a rotor, the second reservoir portion storing the cooling oil ejected from the first reservoir portion, and a shaft oil path that supplies the cooling oil to the shaft of the rotor,
   wherein a bearing oil path that supplies the cooling oil to a bearing of the rotor extends from a first hole in the second reservoir portion, and
   wherein the shaft oil path extends from a second hole in the second reservoir portion,
   wherein the cooling oil is supplied to the bearing of the rotor without passing through the second hole, and
   wherein the first hole from which the bearing oil path extends is provided at a position lower than the second hole from which the shaft oil path extends.

2. The rotating electrical machine according to claim 1, wherein the cooling oil supplied from the second reservoir portion is divided into the bearing oil path that supplies the cooling oil to the bearing of the rotor and the shaft oil path that supplies the cooling oil to the shaft of the rotor.

3. The rotating electrical machine according to claim 1, wherein an oil path in the axial direction of rotation of the shaft and an oil path in the radial direction of the shaft are provided in communication in the shaft of the rotor.

4. The rotating electrical machine according to claim 1, wherein the rotor cooling structure includes cooling the bearing, and the cooling oil is supplied to the bearing from the vent of the first reservoir portion.

5. The rotating electrical machine according to claim 1, wherein the stator cooling structure includes cooling a stator coil end, and the cooling oil is supplied to the stator coil end from the vent of the first reservoir portion.

6. The rotating electrical machine according to claim 1, wherein the first hole is provided in a part configuring the second reservoir portion, and the cooling oil is supplied to the bearing from the first hole.

7. The rotating electrical machine according to claim 2, wherein a position from which the cooling oil is ejected by the bearing oil path is a position higher than a position from which the cooling oil is ejected by the shaft oil path.

8. The rotating electrical machine according to claim 1, wherein a bottom surface of the second reservoir portion includes a first portion and a second portion, and wherein the first portion is positioned below the second portion.

9. The rotating electrical machine according to claim 6, wherein a bottom surface of the second reservoir portion includes a first portion and a second portion, and wherein the first portion is positioned below the second portion.

10. The rotating electrical machine according to claim 9, wherein the first hole is provided at the first portion of the bottom surface of the second reservoir portion.

11. The rotating electrical machine according to claim 1, wherein the first reservoir portion comprises at least two cooling systems, a first system from among the at least two cooling systems extending to the stator and a second system from among the at least two cooling systems extending to the rotor.

* * * * *